May 14, 1929.  H. A. MULVANY  1,712,932
ELECTRIC COOKER
Filed May 3, 1927
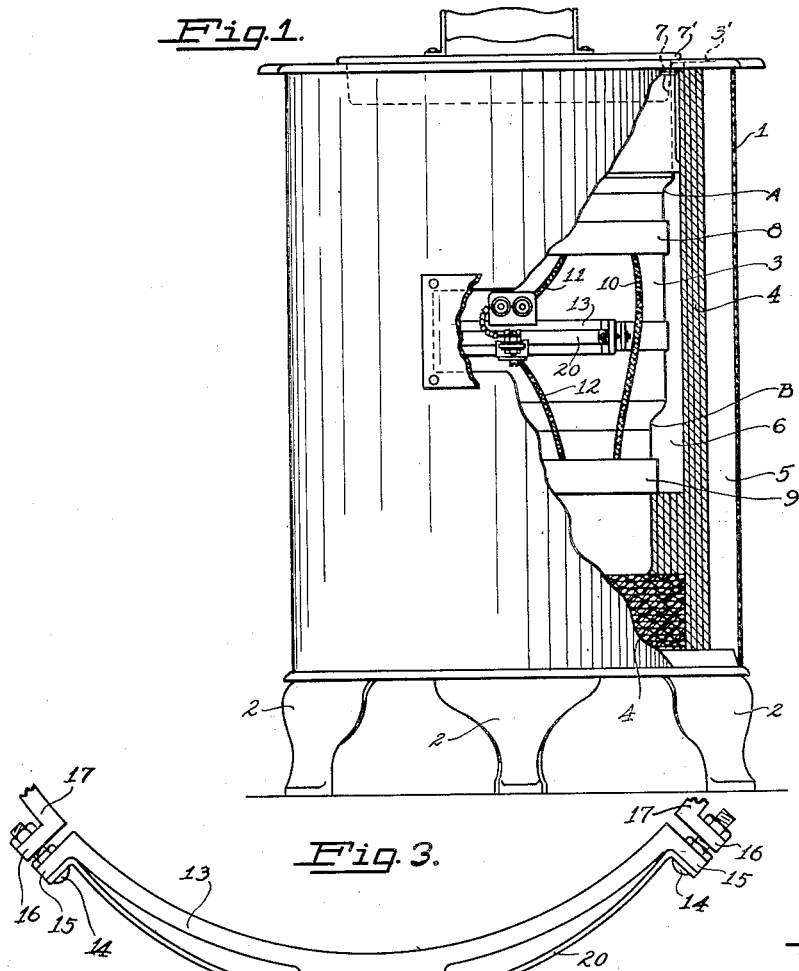
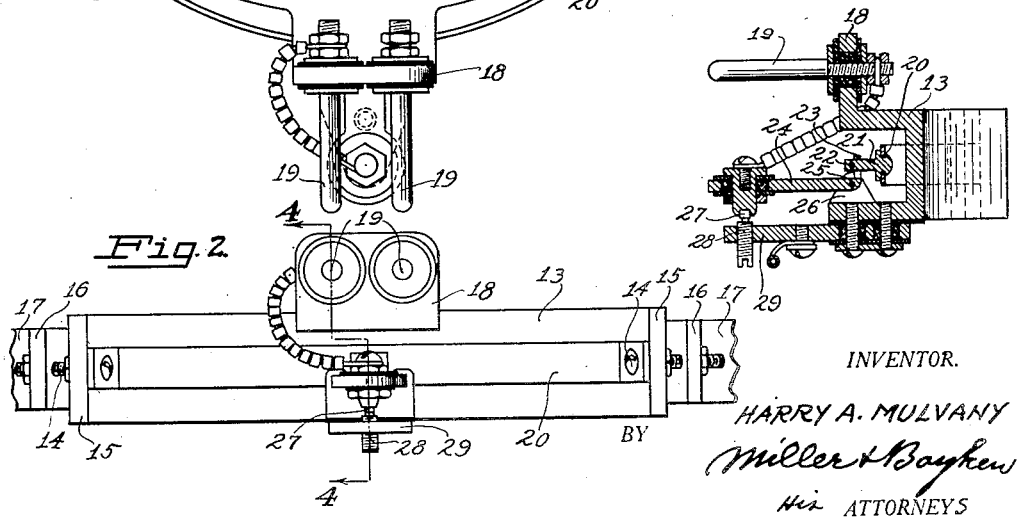
INVENTOR.
HARRY A. MULVANY
BY Miller & Boykew
His ATTORNEYS Patented May 14, 1929.

1,712,932

UNITED STATES PATENT OFFICE.

HARRY A. MULVANY, OF SAN FRANCISCO, CALIFORNIA, ASSIGNOR TO NATIONAL APPLIANCE CORPORATION, OF SAN FRANCISCO, CALIFORNIA, A CORPORATION OF NEVADA.

ELECTRIC COOKER.

Application filed May 3, 1927. Serial No. 188,441.

This invention relates to electric-cookers as used in the kitchen in the preparation of foods, and the objects of the invention are to provide a cooker of this type which will effectively cook the foods placed therein while functioning to prevent the distribution of dissimilar food flavors among several foods cooked at once therein, and also provide improved mechanical details of construction as will appear in the following specification.

In the drawings accompanying this application Fig. 1 is a side elevation of my cooker with portion of the side broken away so as to reveal the thermostat arrangement forming an important part of the invention. Fig. 2 is an enlarged front view of the thermostat shown in Fig. 1. Fig. 3 is a plan view of Fig. 2 and Fig. 4 is a sectional view of Fig. 2 as seen from the line 4—4 thereof.

In further detail the drawings show a cooker comprising a cylindrical shell 1 mounted on legs 2, a cylindrical metal lining 3 spaced inward from the shell, and with the space between the lining and shell partly filled with heat-insulating packing as at 4 and partly consisting of air spaces as at 5 and 6.

The inner lining 3 is open on top forming a cooking chamber to receive the articles to be cooked each in separate kettles, and terminates with a flange 3' forming the top surface of the cooker, while a heavy heat-insulated lid 7 having a flange 7' fits within the open upper end of the chamber sealing same from outer air.

The lining 3 is reduced in diameter at different points downward as at A and B so that the larger kettles must go on top of the smaller ones, and it is intended that each device hold a plurality of superimposed kettles of the spring clamp lid type as commonly used in cookers to get a relatively higher cooking heat and pressure within the device, than would be had with loose lid kettles.

To heat the chamber a pair of electric heating elements of any preferred type of construction in the form of bands 8 and 9 are spacedly secured around the outside of the lining or chamber and are suitably wired as at 10—11—12 in series to one another and to a combined thermostatic and plug switch.

The switch comprises an elongated piece of metal or expansible base 13 such as an aluminum casting curved to fit against the exterior of the chamber lining and secured to the chamber by means of screws 14 passing through lugs 15 at the ends of the base piece 13 and engaging the outwardly turned ends 16 of a metal strap or band 17 passing around the chamber lining in a manner so that the band and base may be drawn snugly and tightly against the outside of the chamber lining and thus effectively transmit the heat of the lining to the base.

At the forward upper edge of the base is a lug 18 on which is mounted a pair of insulated plug terminals 19 projecting at right angles to the cylindrical lining, while secured to the inner faces of lugs 15 by the screws 14 are opposite ends of a bowed thermostat spring 20 arched away from the base as shown. This spring is relatively to the base non-expansible by heat so that the base in elongating by heat will stretch the spring ends outwardly and thereby retract the arched portion inward or toward the base piece.

A rivet 21 projecting forwardly from the center of the spring is provided with a cross pin 22 engaging the forward side of the short arm 23 of a bell crank lever 24 pivoted at 25 to a small lug 26 formed on the base, so that as the arch of the spring is retracted the pin 22 will pull against the short arm to raise the long arm of the lever.

The long arm 24 carries an insulated contact 27 adapted to seat against a screw adjustable contact 28 carried on a plate 29 insulatingly supported from the base as indicated.

As the novelty of the structure lies principally in the general arrangement of base and its appurtenances or thermostat assembly as well as in its mode of attachment to the chamber lining 3 and since no circuit novelty is involved in the series wiring of the elements to and through the plug switch and thermostat make and break contacts, the wiring is sufficiently indicated on the drawing without detailed explanation.

The setting of the screw contact 28 determines the temperature at which the thermostat will break the circuit.

Due to the effective manner of mounting and the leverage ratio and sensitiveness of this thermostat it will control the temperature of the chamber as provided by the heating elements within two or three degrees, in fact may be adjusted to work within this figure, and thereby insuring that no material drop of temperature will take place when once the chamber is heated upon plugging in the current leads, whereas, so far as is known, the electric cookers heretofore available on the market usually involved a drop of some 20 to 40 degrees before the thermostat operated to close the circuit and restore the heat, and after which a repetition of the drop occurred.

Such drops in the chamber heat were not considered of importance, but I have discovered a direct relation to permissible drop and quality of cooking, for with cookers of this kind several kettles of different kinds of foods are superimposed, each with its lid lightly clamped in place and the cooker started, and it frequently happens that a strong flavored food will send out its vapors or penetrating odors and flavors to impregnate the milder foods rendering them unpalatable.

My discovery is that such contamination of one food by another is due entirely to temperature drop in the cooker, for with my arrangement as described and which maintains the temperature substantially constant it is possible to cook onions in the lower kettle and a custard in the upper kettle, without the slightest flavor of the onions being detectable in the custard.

If, however, the plug is pulled out for a short time to permit a substantial drop in temperature, absorption of onion flavor by the custard at once takes place, or also if the temperature drops below the boiling point.

In view, therefore, of my discovery of this fact of non-absorption of food flavors by separated foods cooked in a common chamber under substantially maintained temperature, I feel entitled to a process claim covering the application of my discovery to the art of cooking as well as claims to my improved mechanism whereby it was brought about, the process being claimed in a divisional application hereof filed under Serial No. 224,276 on October 5, 1927.

I claim:—

1. A thermostatic switch comprising an elongated metal base member longitudinally arched to fit the curved wall of a cylindrical heating chamber, an elongated sheet metal spring positioned on the convex side of said base member in lengthwise extension therewith and secured at its ends thereto, said spring being arched outward from said base member and of lesser expansibility through the action of heat, a movable electrical contact carried by said base member, and an operative connection between said contact and said spring whereby the expansion of said base member will contract said spring and move said contact.

2. A thermostatic switch comprising an elongated metal base member longitudinally arched to fit the curved wall of a cylindrical heating chamber, an elongated sheet metal spring positioned on the convex side of said base member in alignment with and secured at its ends thereto, said spring being arched outward from said base member and of lesser expansibility through the action of heat, a fixed electrical contact carried by said base, a lever having a long and a short arm pivotally mounted on said base, an electrical contact on the long arm of said lever, and a pivotal connection from the short arm of the lever to said spring.

3. A thermostatic switch comprising an elongated metal base member longitudinally arched to fit the curved wall of a cylindrical heating chamber, an elongated sheet metal spring positioned on the convex side of said base member in alignment therewith, said spring arched outward from said base member, and both the ends of the spring and base member being turned outward and clamped together, said spring being of lesser expansibility through the action of heat than said base member, and an electrical contact connected to said spring arranged and adapted for tripping by movement of said spring relative to the base member.

HARRY A. MULVANY.